Nov. 14, 1939. C. R. PALMER 2,180,285

THERMOMETER

Filed Jan. 24, 1938

INVENTOR.
Charles R. Palmer
BY Wood & Wood
ATTORNEYS

Patented Nov. 14, 1939

2,180,285

UNITED STATES PATENT OFFICE 2,180,285

THERMOMETER

Charles R. Palmer, Glen Acres, Ohio, assignor to The Palmer Company, Norwood, Ohio, a corporation of Ohio Application January 24, 1938, Serial No. 186,503

3 Claims. (Cl. 73—371)

This invention relates to thermometers and has particular application to a thermometer that is used for a purpose which permits the indication of a temperature within a certain zone or range, rather than in exact degrees or fractions thereof.

One object of my invention has been to provide a thermometer which will quickly, and certainly, disclose whether a particular temperature is within a certain comparatively broad range, rather than within a certain degree or fraction of a degree.

A second object of my invention has been to provide a thermometer adapted for use under particular conditions. Throughout this application the ordinary domestic ice box, or electric refrigerator, will be treated as a typical example of the conditions under which the thermometer of my invention is particularly adapted to be used.

A third object of my invention has been to provide a thermometer which will indicate various ranges of temperature by means of a reflection of a color stripe of variegated colors in the mirror-like surface of a thermally expansive fluid, such as mercury. Otherwise stated, it has been the object of my invention to provide a thermometer which will indicate temperature by a reading of color, rather than by a reading of degrees on a conventional graduated scale.

Other objects and purposes will be apparent in the further and more detailed description of my invention, in which.

Figure 4:
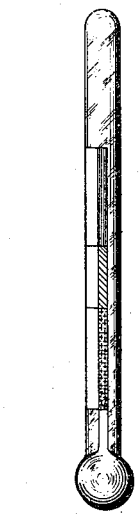

In Figure 4, the mercury has advanced to the top of the highest color section.

The invention is disclosed in relation to a mercury column in a glass tube, since these are the elements which are conventionally used in making the more accurate thermometers; although it must be understood that the invention may be used with other transparencies and other liquid columns, including some which are in use at the present time, as well as others which may be developed subsequently.

The type of thermometers to which the invention has a particular application is disclosed in the United States patent to Palmer et al., No. 1,819,919, issued August 18, 1931. The thermometers of this patent comprise a bulb constituting a reservoir for mercury, and a stem or tube having a bore within which the mercury can expand to varying levels to indicate temperature. According to the patent, the mercury column constitutes a mirror surface which reflects light from a stripe or color extending substantially parallel to the bore of the tube. The color stripe is disposed so as to be reflected by the column of mercury through the reading face of the tube. A backing, or curtain, behind the mercury column, is provided to facilitate differentiation of the color reflected by the column. The stem is configurated to constitute a magnifying lens in order to facilitate reading of the temperature indication, and the stripe may be shielded, or concealed further to facilitate the reading.

The ordinary thermometer, including those of the type disclosed in the aforesaid patent to Palmer et al. is graduated for reading temperatures in degrees or fractions of degrees. Although such accuracy of reading is probably essential in the case of thermometers and many types of industrial thermometers, there are many purposes for which a thermometer may be used, where extreme accuracy is not essential. An example of this would be a thermometer which is placed in an ice box for the purpose of denoting temperature conditions within the ice box. Inasmuch as the reading of temperatures by degrees and fractions of degrees is an inherently difficult thing in the case of practically all types of thermometers, except those which have a very large bore, in situations where an exact accuracy of temperature registrations is not absolutely required, or where it is desirable to maintain either a minimum or maximum temperature or a determined range of temperature, it is desirable to provide a thermometer from which temperature can be determined with a maximum of ease.

Figure 1:
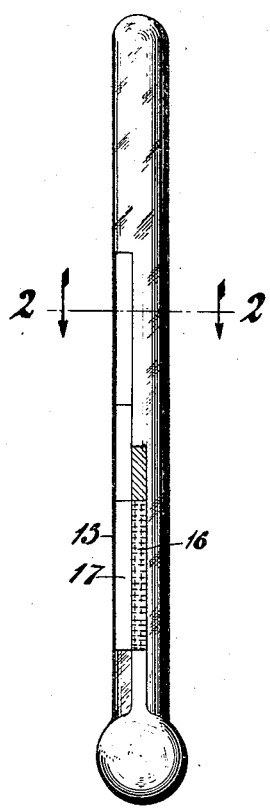
Figure 1 is a front elevation of a thermometer of the general type of my invention with the mercury advanced partially through the center color range of a series of three such ranges.
Figure 2:
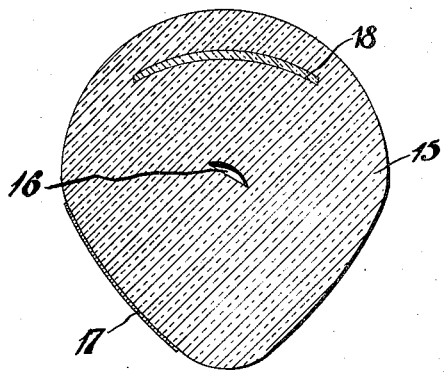
Figure 2 is a cross-section along the line 2—2, Figure 1.
Figure 3:
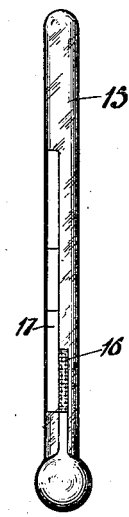
Figure 3 is the same thermometer, still in reading position, and with the mercury advanced only partially through the range of the first color.

Referring specifically to Figure 2 of the drawing, a thermometer tube is indicated at 15. The tube is so shaped in cross section that the reading face constitutes a lens adapted to magnify the bore 16 or an image of the liquid in the bore. The bore is of oblong configuration and includes a flat surface or panel disposed at an angle to the reading face or lens, so as to reflect the image of the color stripe 17 which is located at the side of the bore, in the mirror-like surface of the mercury in the bore.

The flat panel or reflecting surface of mercury in the bore acts as a mirror only to the extent that the mercury fills the bore. Since the angle of incidence of the panel reflects the image of the color stripe centrally of the lens, the image is magnified considerably and is very easily observed.

In order to provide a contrasting background for the colors, the white curtain 18 is provided in the tube directly behind the bore. This curtain is of translucent material in order to permit the entry of light from the rear of the tube. In installations where the usual light inside the refrigerator is to be utilized, the light enters through the open portion of the base piece of the casing and illuminates the color stripe in this manner.

One of the concepts of the present invention is to constitute the column of mercury a mirror surface which will reflect different colors to indicate temperatures within particular ranges. Various different colors respectively confined to predetermined temperature ranges may be reflected from a vari-colored stripe, properly positioned in relation to the bore in the thermometer tubing. The principle of the reflecting mercury column is disclosed in the aforesaid patent to Palmer et al. The color column is composed of a plurality of color sections, one above the other, each color section extending over a particular, predetermined temperature range.

In reading the thermometer, the colors are reflected from the mirror surface up to a point equal to the height of the mercury in the bore. The uppermost color so reflected denotes the temperature range.

A particular application of the invention would be a thermometer having a color column of three colors and designed for use in a domestic ice box or refrigerator. Assuming the use of the colors yellow, green, and red, positioned respectively one over the other, the yellow might indicate a freezing temperature, such as one below 30° to 32° F., the green, safe refrigerator temperature zone, and the red, a temperature above the zone of safety.

Another application of the invention is a clinical thermometer in which all temperatures under fever heat are indicated by a more or less neutral color such as silver or yellow, and temperatures above fever heat, by another color such as red. In this application a conventional reading scale may serve as the primary temperature indicator.

As the mercury rises in the bore, the first color to be reflected will be that which is lowest on the stripe. As it continues to rise, the second lowermost color will also appear, and subsequently the third, so that when the mercury column has reached the top of the bore, all three colors will be apparent. When it is entirely confined in the bulb, none of the colors will be visible.

The colors constituting the stripe are preferably placed on the thermometer tubing or stem by a decalcomania, by enameling or by various other ways.

A particular advantage of the use of the thermometer of my invention, in conjunction with a domestic ice box or electric refrigerator, resides in the fact that, in order to obtain an accurate reading of the temperature within the refrigerator, it is desirable that the thermometer be positioned toward the interior of the refrigerator, rather than adjacent to the door, where it would be more frequently subjected to the influence of the temperature of the room whenever the door is opened. The difficulty of reading degrees on a thermometer located toward the back of the refrigerator is apparent. On the other hand, if the thermometer tube be visible at all, the reading of colors is a comparatively simple matter.

Other uses to which the thermometer of my invention would be particularly adapted would be any conventional thermometer use in which an exact reading of temperature is not required, or in which it is difficult to get sufficiently close to the thermometer to observe the degree reading.

Having described my invention, I claim:

1. In a thermometer, a tube having a longitudinal bore therein and a color stripe comprising a plurality of color sections positioned on the tube parallel to the bore, said bore having a flattened surface and being so inclined with respect to the reading face of the thermometer and so oriented to the color stripe that a reflective and thermally expansive fluid rising in the bore will reflect the color sections successively through the reading face.

2. A thermometer comprising a tube having a longitudinal bore therein, a reading face on said tube, a bulb for containing a reflective and thermally expansive fluid, and a color stripe comprising a plurality of color sections positioned on the tube parallel to the bore; said bore having a flattened surface so inclined with respect to the reading face and so oriented to the color stripe surface that the reflective and thermally expansive fluid rising in the bore will reflect the color sections successively through the reading face.

3. As an article of manufacture, a transparent thermometer tube having a bore therein, a lens portion, and a color stripe comprising a plurality of color sections arranged serially, carried by the tube, said stripe being parallel to the bore, said bore having a flattened surface inclined with respect to the lens portion and oriented with respect to the color stripe to effect the reflection of the color stripe in a reflective fluid in the bore through the lens portion of the tube.

CHARLES R. PALMER.